[19] United States Patent
Smith

[15] 3,663,372
[45] May 16, 1972

[54] METHOD OF PREPARING A DRIED GLUCOAMYLASE PREPARATION

[72] Inventor: Jay Allen Smith, Downers Grove, Ill.
[73] Assignee: CPC International Inc.
[22] Filed: Mar. 27, 1969
[21] Appl. No.: 811,252

[52] U.S. Cl. ............................. 195/66 R, 195/31 R, 195/62
[51] Int. Cl. ........................................................ C07g 7/02
[58] Field of Search .............................. 195/62, 31 R, 66 R

[56] References Cited

UNITED STATES PATENTS 3,047,471   7/1962   Hurst et al. ...................... 195/31 R X Primary Examiner—Lionel M. Shapiro
Assistant Examiner—James R. Hoffman
Attorney—Frank E. Robbins, James L. Bailey, Janet E. Price, Robert D. Weist, Martha A. Michaels and Dorothy R. Thumler

[57] ABSTRACT

A process is set out for producing a highly concentrated glucoamylase preparation, which is carrier-free, by adding a precipitant to an aqueous solution of glucoamylase in sufficient quantity to precipitate the glucoamylase; separating at least a substantial portion of the solution from the glucoamylase precipitate, while keeping the precipitate in an unagglomerated form; then adding a dehydrating solvent to the precipitate; and recovering the precipitate. The precipitate is then separated from the liquid, dried, and a highly concentrated glucoamylase preparation is recovered.

11 Claims, No Drawings

METHOD OF PREPARING A DRIED GLUCOAMYLASE PREPARATION

This invention sets out a method for preparing a highly concentrated glucoamylase preparation that is not diluted by the presence of an inert carrier.

A typical method of concentrating glucoamylase from a fermentation broth is to mix the broth with an inert carrier such as diatomaceous earth and with a water miscible solvent. The glucoamylase in the fermentation broth is adsorbed onto the carrier. The carrier serves as a filter aid. The exact process steps used to accomplish this differ depending upon the particular fermentation broth from which the glucoamylase is being concentrated and the particular inert carrier being used. Glucoamylase-carrier preparations obtained in this manner do, however, have several things in common. They all contain a carrier which is often of an abrasive nature. The abrasive carrier can cause erosion of centrifuges used in the processing hydrolyzates formed by the action of glucoamylase. Unless the glucoamylase-carrier preparations are dried they also all contain a substantial amount of water adsorbed along with the glucoamylase. In addition, the activity of the glucoamylase is diluted by the presence of the carrier.

The presence of a carrier presents problems since it often must be removed from the end product that is produced by the action of the glucoamylase upon a substrate. The dilution in glucoamylase activity that is caused by the presence of a carrier increases shipping costs of the glucoamylase on the basis of units of glucoamylase activity per unit of glucoamylase preparation.

Glucoamylase is of paramount importance in the starch industry, where it is used to convert starch into other useful products. For example, glucoamylase, often in conjunction with alpha amylase, is used to convert starch to glucose.

In view of the above, a method of producing a highly concentrated glucoamylase preparation, which did not require the incorporation of an inert carrier into the glucoamylase preparation, and which could be performed in a simple and inexpensive manner, would be highly desirable and would lead to significant process improvements in the production of products by the action of glucoamylase.

It therefore is one object of this invention to provide a process for producing highly concentrated glucoamylase preparations.

A further object of the invention is to provide a highly concentrated glucoamylase preparation which does not contain an inert carrier.

Another object of the invention is to provide a highly concentrated glucoamylase preparation which is higher in glucoamylase activity than prior art commercial glucoamylase preparations.

Other objects of the invention will be apparent hereinafter from the description that follows and from the appended claims.

DETAILED DESCRIPTION OF THE INVENTION

This invention is a process for producing a highly concentrated glucoamylase preparation by adding to an aqueous solution containing glucoamylase a precipitant for the glucoamylase to cause the glucoamylase to precipitate, separating at least a substantial portion of the solution from the precipitate, while keeping the precipitate in an unagglomerated form; then adding a dehydrating solvent to the precipitate; and recovering the precipitate.

It is essential to the process that neither the precipitant nor the dehydrating solvent used inactivates the glucoamylase. It is also important to the process that the suspension be sufficiently agitated, to insure that the glucoamylase precipitate remains in suspension. If the particles of the glucoamylase precipitate are allowed to clump together and agglomerate, only the surface of the agglomerated glucoamylase precipitate will be efficiently dehydrated, and the resulting product will then be gummy rather than powdery, and will contain excessive amounts of trapped solvent and water.

It is highly preferred that the precipitation and dehydration be carried out in two steps. This can be done by first adding to the aqueous glucoamylase solution a sufficient amount of a precipitant to precipitate the glucoamylase, separating the precipitate from the solution along with enough solution to maintain the precipitate suspended without clumping, and then adding a dehydrating solvent to the precipitate suspension. The addition of the dehydrating solvent dehydrates the enzyme protein to the extent necessary to permit the steps that follow.

The separation of the suspended precipitate after the precipitant addition can be performed by any convenient method. For example, decantation is convenient, either with or without centrifugation. It is important that the decantation be performed before the precipitate has settled to the point where clumping begins. Agitation is, of course, not performed during the settling or centrifuging operation. Generally, as much as about 90 percent of the solution can be decanted from the precipitate without the occurrence of clumping.

The preferred precipitant is a water-miscible solvent. Another usable precipitant is ammonium sulfate. The preferred dehydrant is also a water-miscible solvent.

When both the precipitant and the dehydrant are water-miscible solvents, a primary advantage, in performing the process with the solvent addition in two steps, is that the aqueous solution, which contains glucoamylase, may and usually does contain other proteinaceous material. If sufficient water-miscible solvent is added initially, to cause the glucoamylase to both precipitate and to become dehydrated, then a great deal of this additional proteinaceous material, that is present in the solution, will be co-precipitated with the glucoamylase. The amount of co-precipitated proteinaceous material can be minimized by using the following two step process. First, only enough water-miscible solvent is added to precipitate the glucoamylase. Next, the bulk of the solution is separated from the precipitate. Finally, the precipitate is dehydrated with a second portion of water-miscible solvent. The resulting dehydrated glucoamylase precipitate contains only a relatively small portion of the non-glucoamylase proteinaceous material originally present in the aqueous glucoamylase solution.

The total amount of water-miscible solvent needed for the two step process is far less than that needed for the one step process. This is true because in the two step process the decantation of the bulk of the solution after the precipitation step greatly reduces the total amount of water present. This in turn reduces the amount of water-miscible solvent needed in the dehydration step to provide a suitable solvent-to-water ratio for effective dehydration.

When the two step solvent addition process is used, it is usually sufficient to add an amount of water-miscible solvent to the aqueous glucoamylase solution in the precipitation step to provide a solvent-to-water ratio above about 1, by volume. Preferably, the amount of water-miscible solvent added to the aqueous glucoamylase solution provides a solvent-to-water ratio falling within the range from about 1 to about 2.

In the dehydration step of the process, the amount of water-miscible solvent added to the precipitate, to accomplish dehydration of the precipitated enzyme, should generally provide a solvent-to-water ratio above about 4, preferably within the range from about 4 to about 10. All solvent-to-water ratios discussed herein refer to total volume of water-miscible solvent or solvents to total volume of water present on a solvent-free basis.

It is not necessary that the process be performed utilizing the same water-miscible solvent as the precipitant and as the dehydrant. For example, precipitation can be accomplished utilizing one solvent, and the second solvent addition, to effect further dehydration, may utilize another different solvent. Alternatively, one solvent may be used as both precipitant and dehydrant. Mixtures of suitable solvents may also be used in either or both steps.

Examples of usable solvents are low molecular weight water-miscible organic solvents, for example, water-soluble alcohols such as methanol, ethanol, and isopropyl alcohol; low molecular weight water-soluble ketones such as acetone and methyl ethyl ketone; low molecular weight water-soluble ethers, such as p-dioxane; and mixtures thereof. The only essential requirements for the solvent are that it be a water-miscible solvent and that it does not significantly inactivate the glucoamylase during the process.

The precipitate is separated from the liquid, after the second or some subsequent solvent addition, by any convenient means, preferably by filtration. The filter cake is then either air or vacuum dried to obtain a dry solid product that contains the glucoamylase activity in highly concentrated form.

The temperature at which the precipitation and dehydration steps are performed is not highly critical. Any temperature may be employed from the freezing point of the solution up to the temperature at which glucoamylase inactivation will occur. Generally, glucoamylase inactivation will not occur up to at least about 50° C. Operation at ambient indoor temperature is most convenient.

The pH is also not critical. Generally, if the procedure is carried out at a pH falling within the range from about 2 to about 8, glucoamylase inactivation will not occur and a highly concentrated glucoamylase preparation can be obtained. The preferred pH range is from about 3.0 to about 4.5.

An advantage of the process is that the water-miscible solvent or solvents used can be recovered for reuse. The solvent or solvents can be recovered by any common method such as, for example, distillation.

The aqueous glucoamylase solution from which the highly concentrated glucoamylase preparation is obtained is generally a fermentation broth. Preferably, all solid material has been removed from the fermentation broth prior to treatment with the water-miscible organic solvent.

For the production of glucoamylase, the fermentation broth is preferably selected from the group of fermentation broths in which fungi of the genera Aspergillus, Rhizopus, and Endomycopsis, are ordinarily cultured. Most preferably, the fermentation broth is a fermentation broth produced by fungi of the *Aspergillus Niger* group. These preferences are based solely on the fact that the enumerated fungi produce glucoamylase in relatively high yields. The process itself is applicable to any fermentation broth or indeed any water solution which contains glucoamylase.

When glucoamylase is produced from the three preferred fungi genera listed above, a quantity of alpha amylase is generally produced in the same fermentation broth. When the glucoamylase is precipitated, the alpha amylase is generally co-precipitated along with it. Thus, the resulting highly concentrated glucoamylase preparation after drying, generally exhibits alpha amylase activity as well as glucoamylase activity. In addition, the highly concentrated, dried glucoamylase preparation generally contains some amount of co-precipitated protein, metal salts, and carbohydrates.

Typically the concentrated dry glucoamylase preparation will contain an amount of moisture falling within the range from about 5 percent to about 15 percent, an amount of total protein falling within the range from about 40 percent to about 70 percent based on total dry substance, and the remainder will be metallic salts, carbohydrates, cellulose and starch degradation products. The active glucoamylase protein will generally account for from about 80 percent to about 100 percent by weight of the total protein. This percentage is, however, quite variable, and is dependent upon such factors as, for example, the particular water-miscible solvent used, the exact ratio of water-miscible solvent to water employed in both the precipitation and the dehydration steps, the fermentation broth being treated, and the like.

When the terms dry or dried are applied herein to the glucoamylase preparations, what is meant is a preparation which appears physically to be dry but which may contain up to about 15 percent by weight of moisture.

Concentrated glucoamylase preparations prepared by the methods described above from fungi of the *Aspergillus Niger* group will exhibit a glucoamylase activity, expressed as units of glucoamylase activity per unit weight of glucoamylase preparation that exceeds that obtainable utilizing prior art commercial processes for preparing glucoamylase concentrates. Glucoamylase activities of over 250 units per gram are easily obtainable by the procedure of this invention, and glucoamylase activities of over 800 units per gram and even over 1,000 units per gram have been obtained when fermentation broths containing as little as 23 glucoamylase units per milliliter have been treated to produce dried, highly concentrated glucoamylase preparations.

In prior art processes the glucoamylase is adsorbed on a carrier and the glucoamylase-carrier composition is then filtered and dried. In the absence of an inert carrier it was not believed to be possible to filter and dry the glucoamylase preparation.

When highly concentrated glucoamylase preparations are made by the process of this invention, these preparations are carrier-free, i.e. they do not contain an inert carrier, such as, for example, diatomaceous earth, as do many prior art glucoamylase concentrates. Thus, it is not necessary to remove the inert carrier from the product or products produced by the action of the glucoamylase preparation.

The presence of an inert carrier is particularly undesirable when the inert carrier is an abrasive material, such as diatomaceous earth since the abrasive material will tend to erode centrifuges if centrifuges are used to remove the inert material and other solid waste materials from the product.

In the practice of the invention, the use of different water-miscible solvents leads to different settling times for the glucoamylase precipitate. Some solvents, for example, methanol, lead to a very fine precipitate which takes longer to settle than the less fine precipitate that is produced, for example, by acetone. The optimum settling time for each solvent can be determined with only limited experimentation. It is, of course, essential not to allow the precipitate to agglomerate.

After the precipitated glucoamylase has been essentially dehydrated it may be separated from the solution in which it is suspended by filtration, centrifugation, decantation and the like, and may then be air dried, vacuum dried, fluid bed dried, freeze dried, or dried by any other convenient technique that is not detrimental to the enzyme activity. The drying should preferably be carried out at a temperature below about 60° C. to prevent inactivation of the glucoamylase.

DETERMINATION OF GLUCOAMYLASE ACTIVITY

Glucoamylase activity is determined upon a substrate which comprises a 15 to 18 D.E. spray dried acid hydrolyzate of corn starch. This material is dissolved in water and diluted to 4.0 grams of dry substance per 100 ml of solution. Exactly 50 ml of the solution is pipetted into a 100 ml volumetric flask. To the flask is added 5.0 ml of pH 4.3, 1.0 molar sodium acetate-acetic acid buffer. The flask is placed in a water bath at 60° C. and after 10 minutes the proper amount of enzyme preparation is added. At exactly 120 minutes after addition of the enzyme preparation the solution is adjusted to a phenolphthalein end point with 1 N sodium hydroxide. The solution is then cooled to room temperature and diluted to volume. A reducing sugar value calculated as dextrose is determined on the diluted sample and on a control with no enzyme preparation added. Glucoamylase activity is calculated as follows:

$$A = \frac{S-B}{2+E}$$

wherein $A$ = glucoamylase activity, units per gram of enzyme preparation
$S$ = reducing sugars in enzyme converted sample, grams per 100 ml
$B$ = reducing sugars in control, grams per 100 ml,
$E$ = amount of enzyme preparation used, grams.

The reducing sugar concentration in the enzyme-converted sample should not be more than 1.0 grams per 100 ml.

DETERMINATION OF ALPHA AMYLASE ACTIVITY

Alpha amylase activity is determined spectrophotometrically by the following procedure. Four ml of a 1.25 percent soluble starch solution, buffered at pH 3.8 with 0.125 molar sodium acetate, is pipetted into a test tube and equilibrated to 60° C. One ml of enzyme solution, made up by dissolving the glucoamylase preparation in water, containing 0.04 – 0.15 unit of alpha amylase activity, is mixed with the starch substrate. One ml samples of the mixture are withdrawn exactly three and thirteen minutes after mixing and the enzyme activity contained therein quenched by immediately transferring the samples to 100 ml volumetric flasks containing 3.0 ml of a 0.1 percent iodine solution. After the addition of water to bring the flasks to volume, the optical densities (O.D.) of the diluted samples are determined spectrophotometrically using a 20 mm. light path at 650 nm (nanometer) against a water blank. Enzyme activity is calculated by the following formula:

$$\text{Units of enzyme per ml.} = 0.2303 \log \frac{\text{O.D. 3 minutes}}{\text{O.D. 13 minutes}} \times R$$

where $R$ = dilution factor of enzyme preparation.

The units of alpha amylase per gram of glucoamylase preparation can then be calculated from the known weight of glucoamylase preparation dissolved to form the enzyme solution.

The following examples describe specific demonstrations of the process of making dried, highly concentrated glucoamylase preparations of the invention. These examples are meant to be illustrative and the invention, of course, is not to be limited thereto. All parts and percentages are by weight unless expressly stated to be otherwise.

EXAMPLE 1

Glucoamylase Concentration with Acetone

Two *Aspergillus Niger* fermentation broths were secured. Each broth was separately filtered to remove particulate matter.

One culture filtrate specimen, when analyzed for glucoamylase by the procedure described above, was found to contain 25.0 units per ml. The second culture filtrate specimen contained 26.5 units per ml of glucoamylase activity. Both culture filtrates were treated by identical procedures as follows.

One volume of the culture filtrate, at an adjusted pH of from 3.6 to 3.9, was agitated as 1.5 volumes of acetone was slowly added at 25° C. After 5 to 10 minutes of mixing, the precipitate, which appeared during the acetone addition was allowed to settle for 10 minutes. At the end of this time, the precipitate had settled into the bottom one-tenth of the solution. The top nine-tenths of the solution was decanted and fresh acetone was added. The amount of acetone added this time was in the amount of one-half of the original volume of the culture filtrate.

The precipitate was resuspended by agitating for 5 to 10 minutes. The resulting glucoamylase precipitate was filtered. The filter cake precipitate was a light, loose, almost-white material. The cake was air dried at room temperature.

The final powdered product was analyzed for alpha amylase activity and for glucoamylase activity. The results are summarized in Table 1.

TABLE 1

|  | Specimen A | Specimen B |
|---|---|---|
| Initial culture filtrate, glucoamylase units per ml. | 25.0 | 26.5 |
| Final product, alpha amylase units per gram | 1100 | 1550 |
| Final product, glucoamylase, units per gram | 980 | 873 |
| Recovery efficiency of glucoamylase, % | 91.0 | 96.0 |

The data indicate that highly concentrated glucoamylase preparations, with glucoamylase activities of well over 800 units per gram, and with significant alpha amylase activity, can be produced from *Aspergillus Niger* fermentation broths at well over 90 percent efficiency.

EXAMPLE II

Glucoamylase Preparation Utilizing Several Solvents

Concentrated enzyme preparations were made from four portions of *Aspergillus Niger* broths each having 23U/ml of glucoamylase activity. Each of the four broth portions were filtered prior to the concentration steps. Each broth portion was agitated as 1.5 volumes of a water-miscible solvent was added to each broth filtrate. The solutions were stirred for 5 minutes. The resulting precipitates were allowed to settle without agglomerating. About nine-tenths of a supernatant liquid was decanted from each solution and 0.5 volumes of a water-miscible solvent was added to each solution. The resulting resuspended mixtures were agitated for 5–10 minutes and then filtered through filter paper. The first volume of solvent added to the broth filtrate served as a precipitant for the enzyme. The second quantity of solvent, which was added to the precipitate suspension remaining after nine-tenths of the liquid has been removed, served as a dehydrant. Isopropyl alcohol, acetone and ethanol were tested both as precipitants and dehydrants. The per cent dry substance, protein content and glucoamylase activity of the resulting concentrated enzyme preparations were determined. The results are summarized in Table 2.

TABLE 2

| Preparation | | Final Dry Product | | |
|---|---|---|---|---|
| Precipitant | Dehydrant | Glucoamylase activity units per gram | Dry substance, percent | Protein, percent dry basis |
| Isopropyl alcohol | Acetone | 1043 | 90.6 | 60.3 |
| Isopropyl alcohol | Isopropyl alcohol | 1077 | 90.6 | 58.6 |
| Acetone | Acetone | 1077 | 90.6 | 53.1 |
| Ethanol | Ethanol | 1097 | 90.8 | 62.8 |

The data indicate that isopropyl alcohol, acetone and ethanol may be used either as precipitants or as dehydrants and that it is feasible to use one water-miscible solvent as a precipitant and another as a dehydrant in the process of preparing the highly concentrated glucoamylase preparations disclosed in this invention.

EXAMPLE III

Use of Glucoamylase Preparations to Produce Glucose

Unmodified corn starch was enzyme-thinned with alpha amylase to a dextrose equivalent of 2. Eight aliquot portions of the thinned starch were made up, at 35 percent solids. The pH of each solution was adjusted to 4.5.

To four of the aliquots, a dried glucoamylase preparation, Specimen A of Example 1, was added.

To the other four aliquots, a glucoamylase preparation adsorbed on an inert material, in the conventional manner, was added.

The eight aliquots were then incubated at 60° C. for 72 hours at a pH of 4.5. At the end of this time, the D.E. and glucose content of each of the eight solutions were determined. The results are summarized in Table 3.

TABLE 3

| | Glucoamylase Dose, Units/100 g. dry substance | Conversion Liquor | |
|---|---|---|---|
| | | D.E. | glucose |
| Dry Concentrate | 10 | 97.0 | 96.0 |
| | | 96.9 | 95.9 |
| | 14 | 97.1 | 96.1 |
| | | 96.5 | 95.5 |
| Enzyme on Inert Carrier | 10 | 97.0 | 96.0 |

| 14 | 97.7 | 96.7 |
|---|---|---|
| | 97.0 | 96.0 |
| | 96.1 | 95.1 |

The data indicate that the dried concentrate of glucoamylase produced in accordance with this invention is equally as effective in producing glucose from starch, as a glucoamylase preparation adsorbed on an inert carrier.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

That which is claimed is:

1. A process for the recovery of glucoamylase from an aqueous solution thereof comprising the steps of adding to the solution a sufficient amount of a water-miscible solvent or ammonium sulfate to precipitate the glucoamylase and form a liquid-precipitate suspension, decanting a major proportion up to about 90 percent of the liquid from the glucoamylase precipitate while keeping the precipitate in unagglomerated form, adding from about four to 10 volumes, per volume of water present in the precipitate, of a water-miscible solvent, and recovering the glucoamylase precipitate, said steps being carried out within the range of temperature of from the freezing point of the aqueous solution to the temperature of glucoamylase inactivation, and said water-miscible solvents being characterized by the fact that they do not significantly inactivate the glucoamylase during the process.

2. The process of claim 1 wherein the glucoamylase precipitate is dried to produce a solid glucoamylase product.

3. The process of claim 1 wherein the water-miscible solvents are selected from the group consisting of methanol, ethanol, isopropyl alcohol, acetone, methyl ethyl ketone, p-dioxane and mixtures thereof.

4. The process of claim 1 wherein the fermentation broth is produced by fungi of the *Aspergillus Niger* group.

5. The process of claim 1 wherein the glucoamylase preparation exhibits both a glucoamylase activity and an alpha-amylase activity.

6. The process of claim 1 wherein the aqueous solution of glucoamylase is a fermentation broth produced by fungi of the genera Aspergillus, Rhizopus, or Endomycopsis.

7. The process of claim 1 wherein the water-miscible solvent is acetone.

8. The process of claim 1 wherein the water-miscible solvent is isopropyl alcohol.

9. The process of claim 1 wherein the water-miscible solvent is ethanol.

10. The process of claim 1 wherein the water-miscible solvent used to precipitate the glucoamylase is isopropyl alcohol and the water miscible solvent used later in the process is acetone.

11. In a process for separating undesirable solid materials from hydrolysates of starch produced by the action of the glucoamylase preparation upon gelatinized starch which comprises centrifuging the hydrolysates to remove the insoluble materials, the improvement comprising utilizing the carrier-free glucoamylase precipitate of claim 1 as the glucoamylase preparation and thereby eliminating erosion of the centrifuge by an inert carrier introduced to the gelatinized starch.

* * * * *